US009544384B2

(12) United States Patent
Zhao et al.

(10) Patent No.: US 9,544,384 B2
(45) Date of Patent: Jan. 10, 2017

(54) METHOD AND SYSTEM FOR PUSHING ASSOCIATED USERS IN SOCIAL NETWORKING SERVICE NETWORK

(71) Applicant: TENCENT TECHNOLOGY (SHENZHEN) COMPANY LIMITED, Shenzhen, Guangdong (CN)

(72) Inventors: Jianwei Zhao, Shenzhen (CN); Xin Feng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 467 days.

(21) Appl. No.: 14/040,492

(22) Filed: Sep. 27, 2013

(65) Prior Publication Data
US 2014/0032675 A1 Jan. 30, 2014

Related U.S. Application Data

(63) Continuation of application No. PCT/CN2012/076943, filed on Jun. 14, 2012.

(30) Foreign Application Priority Data

Sep. 27, 2011 (CN) .......................... 2011 1 0296542

(51) Int. Cl.
G06F 15/16 (2006.01)
G06F 17/30 (2006.01)
(Continued)

(52) U.S. Cl.
CPC ............. H04L 67/26 (2013.01); H04L 12/588 (2013.01); H04L 51/32 (2013.01)

(58) Field of Classification Search
USPC ....... 709/204, 219, 217, 226, 223, 221, 227, 709/222
See application file for complete search history.

(56) References Cited

U.S. PATENT DOCUMENTS 8,001,008 B2 * 8/2011 Engle ..................... G06Q 30/02
705/26.62
8,813,193 B2 * 8/2014 Kim ........................ H04L 63/10
726/27
(Continued)

FOREIGN PATENT DOCUMENTS

CN 101452478 A 6/2009
CN 101694652 A 4/2010
(Continued)

OTHER PUBLICATIONS

International Search Report in international application No. PCT/CN2012/076943, mailed on Sep. 27, 2012. (3 pages—see entire document).

(Continued)

Primary Examiner — Jude Jean Gilles
(74) Attorney, Agent, or Firm — Oppedahl Patent Law Firm LLC

(57) ABSTRACT

The present invention provides a method for pushing an associated user in a Social Networking Service (SNS) network and an SNS network system. The method comprises: respectively collecting a plurality of pieces of user data created by each SNS user in an SNS network; extracting, from the plurality of pieces of user data created by each SNS user, at least one label and attribute belonging to the SNS user; generating a user list consisting of a plurality of SNS users having the same label and the same attribute; and pushing, in a bidirectional manner, user lists having the same label and associated attributes. In the present invention, based on user data created by a user, the SNS system automatically searches for associated users thereof, thereby implementing mutual pushing of the associated users, so that communication between SNS users becomes more efficient and convenient.

18 Claims, 5 Drawing Sheets

(51) Int. Cl.
H04L 29/08 (2006.01)
H04L 12/58 (2006.01)
H04L 29/06 (2006.01)

(56) References Cited

U.S. PATENT DOCUMENTS

| | | | |
|---|---|---|---|
| 9,319,390 B2* | 4/2016 | Yu | H04L 63/08 |
| 2008/0222295 A1 | 9/2008 | Robinson et al. | |
| 2009/0083299 A1* | 3/2009 | Chen | G06Q 10/107 |
| 2009/0177651 A1 | 7/2009 | Takamatsu et al. | |
| 2011/0029408 A1* | 2/2011 | Shusterman | G06F 17/30867 |
| | | | 705/27.1 |
| 2011/0040848 A1* | 2/2011 | Xu | G06Q 50/01 |
| | | | 709/213 |
| 2011/0061108 A1* | 3/2011 | Arrasvuori | G06F 21/10 |
| | | | 726/27 |
| 2011/0201317 A1* | 8/2011 | Karandikar | G06Q 30/02 |
| | | | 455/414.1 |
| 2011/0246574 A1* | 10/2011 | Lento | G06Q 10/10 |
| | | | 709/204 |
| 2012/0284135 A1* | 11/2012 | Hunter | G06Q 30/0205 |
| | | | 705/26.3 |
| 2013/0198811 A1* | 8/2013 | Yu | H04L 63/08 |
| | | | 726/4 |
| 2013/0291126 A1* | 10/2013 | Thomson | G06F 17/30014 |
| | | | 726/30 |
| 2014/0082088 A1* | 3/2014 | Ye | H04L 63/102 |
| | | | 709/204 |
| 2014/0310521 A1* | 10/2014 | Ichikawa | H04L 9/0861 |
| | | | 713/165 |

FOREIGN PATENT DOCUMENTS

| | | |
|---|---|---|
| CN | 101770459 A | 7/2010 |
| CN | 102111424 A | 6/2011 |

OTHER PUBLICATIONS

English Translation of the Written Opinion of the International Search Authority in international application No. PCT/CN2012/076943, mailed on Sep. 27, 2012. (6 pages—see entire document).

* cited by examiner

METHOD AND SYSTEM FOR PUSHING ASSOCIATED USERS IN SOCIAL NETWORKING SERVICE NETWORK

TECHNICAL FIELD

The present invention relates to the field of Internet technologies, and more particularly to a method and a system for pushing an associated user in a Social Networking Service (SNS) network.

BACKGROUND

SNS, which is a piece of technical application architecture under the Web 2.0 system, overcomes or solves specific application problems during social relation establishment processes through direct establishment of social friend relations and sharing of human resources among friends. By using SNS, personal data processing, personal social relation management and reliable commercial information sharing can be realized, personal information and knowledge can be shared with trustworthy people safely, personal social networks can be expanded by utilizing trust relationships, and more valuable communication and collaboration can be achieved.

In an SNS network, users can establish data, e.g. blogs, pictures and microblogs etc. Taking blogs for example, when a user establishes and completes a blog, many users who are interested in the blog will be attracted to read and appreciate the blog initiatively. As shown in FIG. 1, in the page of blog X created by user A, an SNS network system will automatically generate a guest list consisting of all users who clicked and read the blog. The owner of the blog may click the guest list to access guests in the guest list, e.g. guest 1, guest 2, guest 3 and guest 4 to communicate.

It can be learned from the prior art above that only those who actually click and view user data created by a certain SNS user will appear in the guest list. In other words, for a certain SNS user who creates user data, the created user data can be only accessed by other users passively, but cannot be pushed to other users automatically. Other SNS users who are interested in the created user data will not appear in the guest list. Thus the SNS user who creates the user data fails to establish connections with other SNS users who haven't viewed the user data, which is very disadvantageous for communication among SNS users.

SUMMARY

The technical problem to be solved by embodiments of the present invention is how to search for associated users by an SNS system automatically for itself based on user data created by a user, thereby implementing mutual pushing of the associated users.

To solve the technical problem above, the present invention provides a method for pushing an associated user in an SNS network, including:

respectively collect a plurality of pieces of user data created by each SNS user in an SNS network;

extract, from the plurality of pieces of user data created by each SNS user, at least one label and attribute belonging to the SNS user;

generate a user list consisting of a plurality of SNS users having the same label and the same attribute;

push, in a bidirectional manner, user lists having the same label and associated attributes.

Accordingly, the present invention further provides an SNS network, including:

a data collecting module, configured to respectively collect user data created by each SNS user in an SNS network;

a label extracting module, configured to extract, from a plurality of pieces of user data created by each SNS user, at least one label and attribute belonging to the SNS user;

a list generating module, configured to generate a user list consisting of a plurality of SNS users having the same label and the same attribute;

a bidirectional pushing module configured to push, in a bidirectional manner, user lists having the same label and associated attributes.

Implementation of the present invention has the following beneficial effect:

based on user data created by an SNS user, the present invention extracts a label and an attribute capable of reflecting a requirement or an interest of the user for the SNS user and generates a user list consisting of SNS users having the same label and the same attribute, then uses the label as an index to search for user lists having the same label and associated attributes, and finally pushes the user lists in a mutual manner, thereby overcoming the disadvantage in the prior art that an SNS user, after creating user data, can pay a return visit to other SNS users having the same interest or a complementary relationship only after passively waiting for other SNS users to visit. In the present invention, based on user data created by a user, the SNS system automatically searches for associated users thereof, thereby implementing mutual pushing of the associated users, so that communication between SNS users becomes more efficient and convenient.

DETAILED DESCRIPTION

The embodiments of the present invention perform data analysis based on user data created by an SNS user, and extract a label reflecting an interest and a requirement of the SNS user. Subsequently, an SNS system searches for an associated user according to the label based on a corresponding relation between labels and SNS users, thereby implementing mutual pushing of associated users, so that communication between SNS users can be enhanced.

Figure 1:
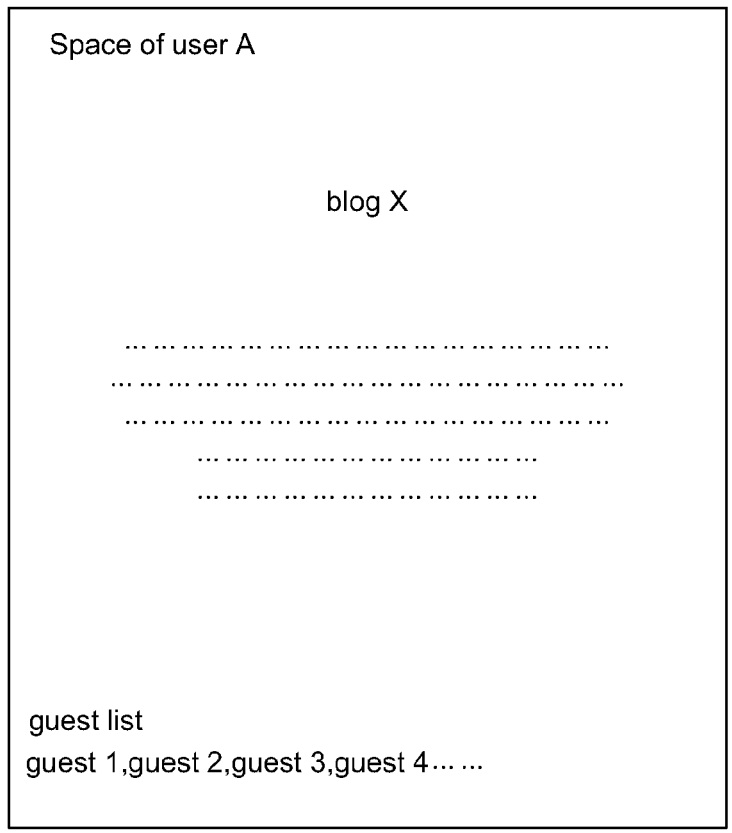
FIG. 1 is a schematic diagram illustrating display of a guest list in a page where user data created by an SNS user locates in the prior art.
Figure 2:
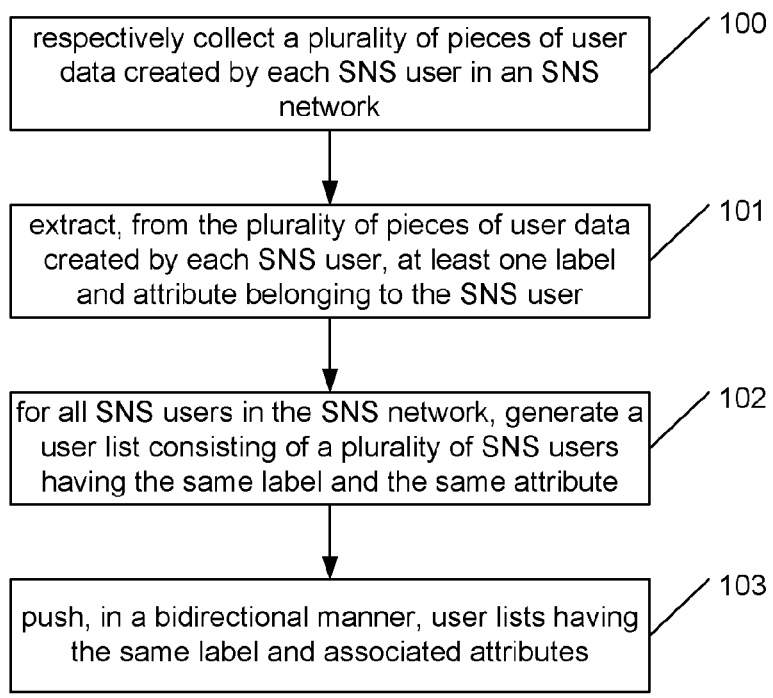
FIG. 2 is a flowchart of an embodiment of a method for pushing an associated user in an SNS network in the present invention.

Referring to FIG. 2, FIG. 2 is a flowchart of an embodiment of a method for pushing an associated user in an SNS network in the present invention.

The method provided by the present embodiment includes:

Step 100: respectively collect a plurality of pieces of user data created by each SNS user in an SNS network;

specifically, user data created by an SNS user in the SNS network may be one or more of a blog, picture description, and a microblog. Expression forms of these user data are texts, so that the user data can be analyzed and labels can be extracted;

Step 101: extract, from the plurality of pieces of user data created by each SNS user, at least one label and attribute belonging to the SNS user;

specifically, according to analysis performed for a plurality of pieces of user data created by an SNS user, a label and an attribute reflecting a concern or an interest of the user are extracted. There is an association relation between the label and the attribute. Generally, the label reflects the concern or the interest of the user while the attribute indicates whether the interest or the concern represented by the label has been practiced;

Step 102: for all SNS users in the SNS network, generate a user list consisting of a plurality of SNS users having the same label and the same attribute;

specifically, after extracting for each SNS user the label and the attribute belonging to the SNS user in Step 101, labels and attributes of all SNS users are sorted, and a plurality of SNS users having the same label and the same attribute are put together to form a user list, thereby forming a corresponding relation between a plurality of groups of labels as well as attributes and the user list;

Step 103: push, in a bidirectional manner, user lists having the same label and associated attributes.

Specifically a user list having the same label and associated attributes is pushed to a plurality of SNS users in another user list; or moreover, user data created by a plurality of SNS users in a user list is pushed to a plurality of SNS users in another user list.

Based on user data created by an SNS user, the present invention extracts a label and an attribute capable of reflecting a requirement or an interest of the user for the SNS user and generates a user list consisting of SNS users having the same label and the same attribute, then uses the label as an index to search for user lists having the same label and associated attributes, and finally pushes the user lists in a mutual manner, thereby overcoming the disadvantage in the prior art that an SNS user, after creating user data, can pay a return visit to other SNS users having the same interest or a complementary relationship only after passively waiting for other SNS users to visit. In the present invention, based on user data created by a user, the SNS system automatically searches for associated users thereof, thereby implementing mutual pushing of the associated users, so that communication between SNS users becomes more efficient and convenient.

A specific implementation process of a method for pushing an associated user in an SNS network in an embodiment of the present invention will be described in details below.

Figure 3:
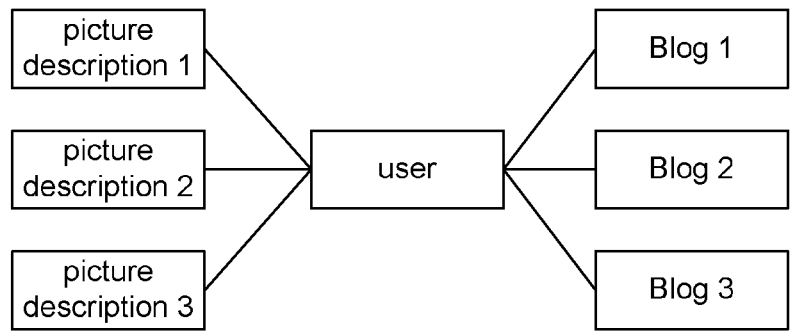
FIG. 3 is a schematic diagram of a first embodiment of a method for pushing an associated user in an SNS network in the present invention.

As mentioned by the embodiment above, the user data described by the embodiments of the present invention may be blogs, picture description or microblogs. FIG. 3 shows that a certain SNS user creates blog 1, blog 2 and blog 3, as well as picture description 1, picture description 2, and picture description 3. During a collecting process, a user ID may be used as an index to collect, in a user database storing user data, the above blog 1, blog 2, and blog 3, as well as picture description 1, picture description 2, and picture description 3 created by the user.

Figure 4:
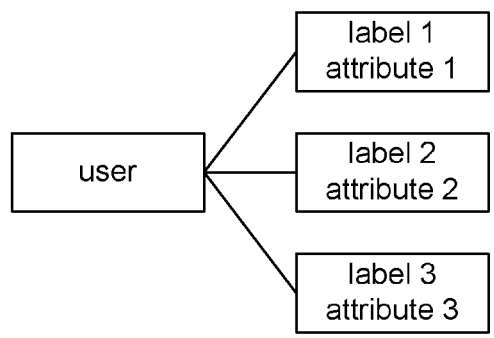
FIG. 4 is a schematic diagram of a second embodiment of a method for pushing an associated user in an SNS network in the present invention.

For each SNS user, after user data created by the SNS user is collected, the user data is analyzed. A label is extracted from the user data to function as a label and an attribute of the SNS user. As shown in FIG. 4, a user may have a plurality of labels and attributes, e.g. corresponding label 1 and attribute 1, label 2 and attribute 2, label 3 and attribute 3.

Specifically, provided that blog 1 created by an SNS user as shown in FIG. 3 is about a travel in Beijing, and a picture whose picture description 1 is also about the travel in Beijing is published. An SNS system may analyze text contents of the blog 1 or picture description 1 statistically, extract label 1 "Beijing" and attribute 1 thereof "have been there". Similarly, if blog 2 is about Food recommendation, specifically buffet recommendation in Shenzhen and picture description 2 describes a buffet in Shenzhen, then text contents of blog 2 and picture description 2 are analyzed statistically to extract label 2 "buffet in Shenzhen" and attribute 2 thereof "tasted". Subsequently, the label "Beijing", the attribute "have been there" and the label "buffet in Shenzhen" and the attribute "tasted" are used as labels and attributes of the user.

It needs to be noted that when the user data created by each SNS user is analyzed, a time segment may be set, e.g. the user data created by the SNS user in 24 hours may be analyzed statistically, to avoid the problem that a resent interest or concern of the SNS user cannot be analyzed correctly due to too much statistic data.

Figure 5:
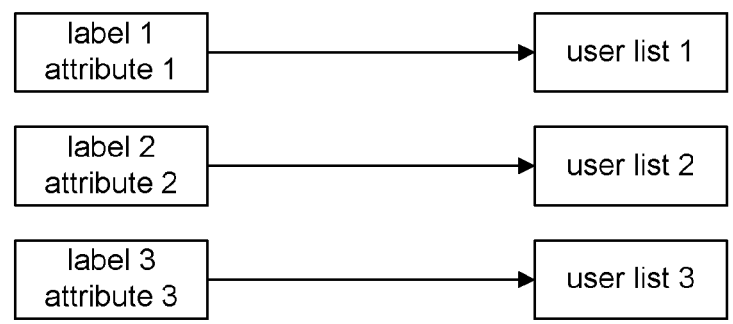
FIG. 5 is a schematic diagram of a third embodiment of a method for pushing an associated user in an SNS network in the present invention.

After the user data created by each SNS user is collected, and labels and attributes are extracted, all SNS user may be sorted according to the labels and the attributes to obtain a schematic diagram as shown in FIG. 5 illustrating a corresponding relation between labels as well as attributes and user lists, e.g. label 1 and attribute 1 correspond to user list 1, label 2 and attribute 2 correspond to user list 2, and label 3 and attribute 3 correspond to user list 3.

In FIG. 5, for example, a user list consisting of all SNS users having a label "Beijing" and an attribute "have been there" is generated. The user list includes all SNS users who have travelled to Beijing. For another example, a user list consisting of all SNS users having a label "Shenzhen" and an attribute "taste a buffet" is generated. Of course, SNS users in a certain range may be sorted to ensure more effective statistics and more effective pushing, e.g. SNS users of a certain area may be generated into a user list of the area.

Figure 6:
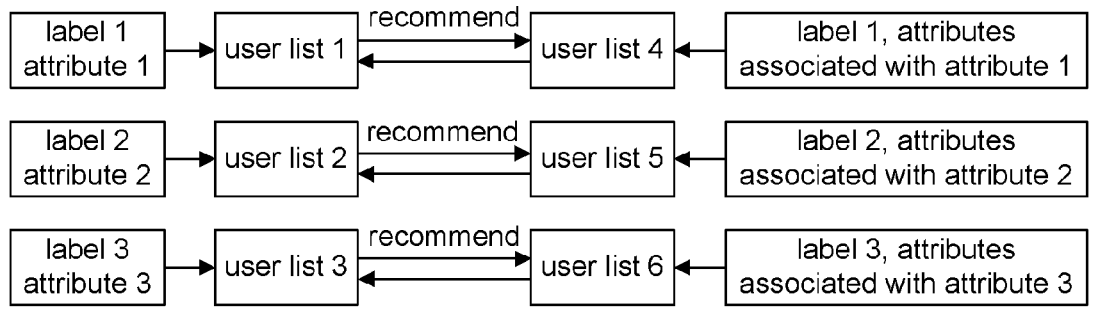
FIG. 6 is a schematic diagram of a fourth embodiment of a method for pushing an associated user in an SNS network in the present invention.

After obtaining the user list, user lists having the same label and associated attributes may be searched, and then the user lists are pushed mutually, specifically as shown in FIG. 6. E.g. user list 1 having label 1 and attribute 1 is pushed to user list 4, and user list 4 has the same label 1 as user list 1 and its attribute is associated with attribute 1 in user list 1. Similarly, user list 2 having label 2 and attribute 2 is pushed to user list 5, and user list 5 has the same label 2 as user list 2 and its attribute is associated with attribute 2 in user list 2. User list 3 having label 3 and attribute 3 is pushed to user list 6, and user list 6 has the same label 3 as user list 3 and its attribute is associated with attribute 3 in user list 3. The attribute association of the present embodiment may be specifically mutual complementation or mutual demands of attributes.

Figure 7:
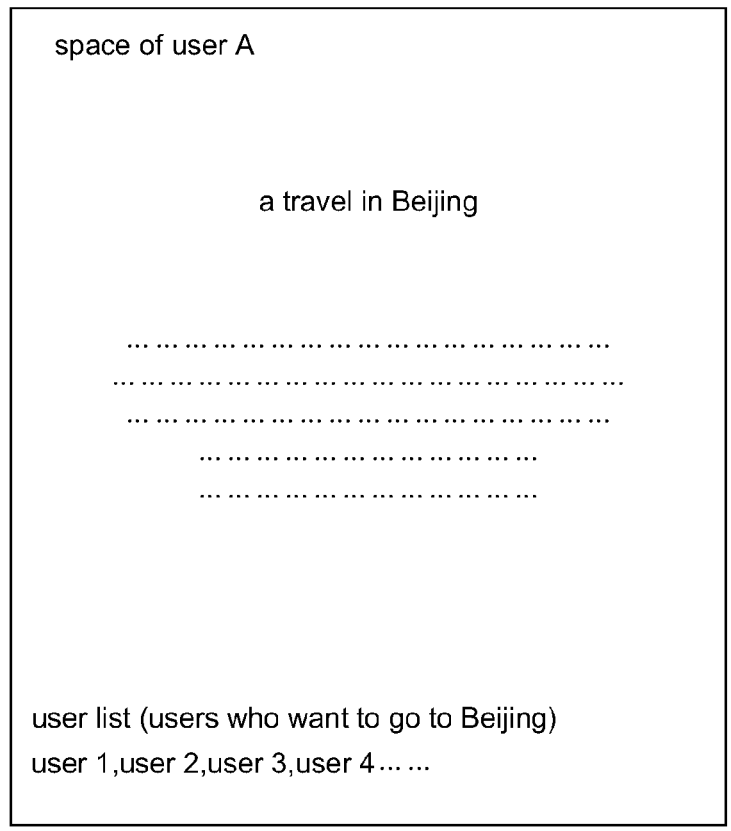
FIG. 7 is a schematic diagram of a fifth embodiment of a method for pushing an associated user in an SNS network in the present invention.

For example, an attribute of one of user list 1 and user list 4 with the same label "Beijing" is "have been there" while an attribute of the other one is "want to go there", it is regarded that the attributes are associated. Therefore, user list 1 and user list 4 are pushed mutually. Specifically, a plurality of SNS users in user list 1 may be pushed to a plurality of SNS users in user list 4. At the same time, the plurality of SNS users in user list 4 are pushed to the plurality of SNS users in user list 1. A schematic diagram of specific implementation is as shown in FIG. 7, after user A creates a blog of "a travel in Beijing", the SNS system will push all SNS users who want to travel in Beijing to a page of the blog "a travel in Beijing" of user A. At the same time, user A and other users who have published blogs "travelled to Beijing", picture description or microblogs etc. may be also pushed to pages of other users labeled "Beijing" with an attribute of "want to go there".

Figure 8:
FIG. 8 is a schematic diagram of a sixth embodiment of a method for pushing an associated user in an SNS network in the present invention.

Of course, user data created by an SNS user of user list 1 may be also pushed to an SNS user of user list 4. In a specific implementation process, only links of blogs or picture description about "a travel in Beijing" are pushed to SNS user B who has created "I want to travel in Beijing", so that user B can click the links of the blogs of "a travel in Beijing" or picture description to access. Of course, access rights may be also set for the blogs or picture description. If a user is set to be access forbidden, the user will not be pushed to other users, and a schematic diagram of specific implementation is as shown in FIG. 8.

Figure 9:
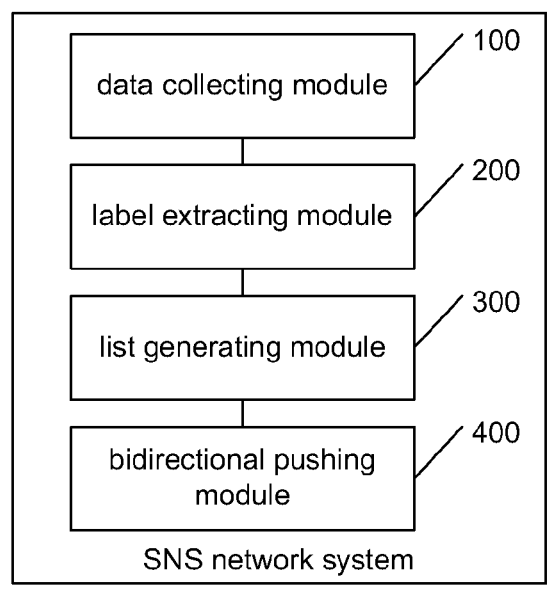
FIG. 9 is a schematic diagram of a first embodiment of an SNS network system in the present invention.

Referring to FIG. 9, FIG. 9 is a schematic diagram illustrating composition of an SNS network system in the present invention.

The system provided by the present embodiment includes:

a data collecting module 100, configured to respectively collect a plurality of pieces of user data created by each SNS user in an SNS network;

specifically, user data created by an SNS user in the SNS network may be one or more of a blog, picture description and a microblog. Expression forms of these user data are texts, so that the user data can be analyzed and labels can be extracted. After being created, the user data is stored in a user database in a server. The data collecting module 100 uses a user ID as an index to collect from the user database the user data created by the SNS user;

a label extracting module 200 configured to extract, from the plurality of pieces of user data created by each SNS user, at least one label and attribute belonging to the SNS user;

specifically, according to analysis performed for the plurality of pieces of user data created by the SNS user, the label extracting module 200 extracts a label reflecting a common characteristic of the plurality of pieces of user data. There may be a plurality of labels. In addition, the label and attribute commonly represent a concern, an interest or a characteristic of the user;

a list generating module 300, configured to generate a user list consisting of a plurality of SNS users having the same label and the same attribute;

specifically, after the label extracting module 200 extracts for each SNS user the label and attribute belonging to the SNS user, the list generating module 300 sorts labels and attributes of all SNS users, and puts a plurality of SNS users having the same label and the same attribute together to form a user list, thereby forming a corresponding relation between a plurality of groups of labels as well as attributes and the user list;

a bidirectional pushing module 400 configured to push, in a bidirectional manner, user lists having the same label and associated attributes;

specifically, the bidirectional pushing module 400 pushes a user list having the same label and associated attributes to a plurality of SNS users in another user list; or moreover, user data created by a plurality of SNS users in a user list is pushed to a plurality of SNS users in another user list. The attribute association is mutual demands or mutual complementation.

Figure 10:
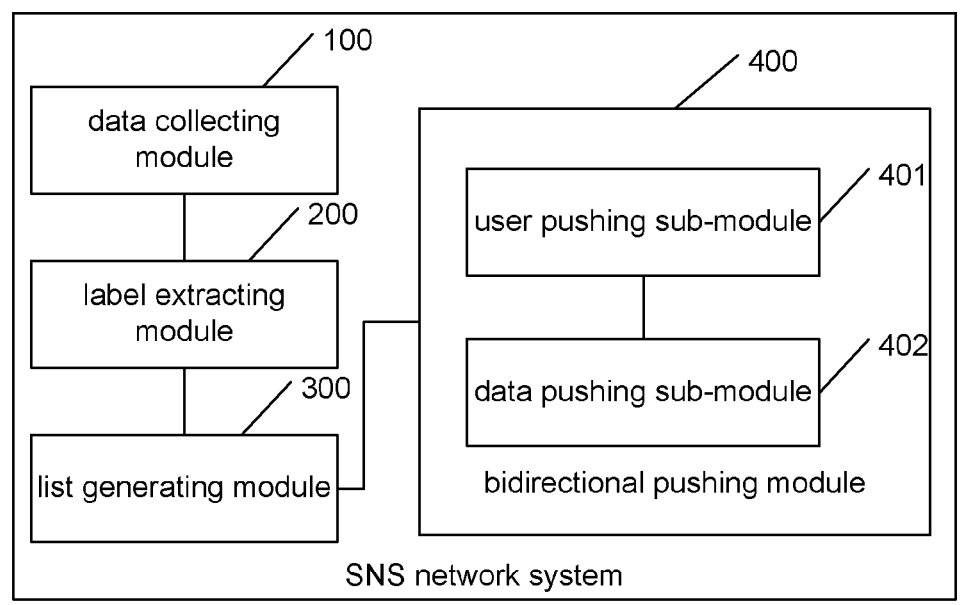
FIG. 10 is a schematic diagram of a second embodiment of an SNS network system in the present invention.

Referring to FIG. 10, FIG. 10 is a schematic diagram illustrating composition of the second embodiment of an SNS network system provided by the present invention.

Similar to the SNS network system of the first embodiment, the SNS network system provided by the present embodiment includes a data collecting module 100, a label extracting module 200, a list generating module 300 and a bidirectional pushing module 400. The present embodiment will describe specific components and functions of the bidirectional pushing module 400 in details, including:

a user pushing sub-module 401 configured to push a user list having the same label and associated attributes to a plurality of SNS users in another user list. FIG. 7 illustrates a schematic diagram of pushing a user by the user pushing sub-module 401, which will not be repeated here;

a data pushing sub-module 402 configured to push user data created by a plurality of SNS users in a user list having the same label and associated attributes to a plurality of SNS users in another user list. FIG. 8 shows a schematic diagram of pushing user data by the data pushing sub-module 402, which will not be repeated here.

Based on user data created by an SNS user, an SNS network system provided by the embodiments of the present invention extracts a label and an attribute capable of reflecting a requirement or an interest of the user for the SNS user and generates a user list consisting of SNS users having the same label and the same attribute, then uses the label as an index to search for user lists having the same label and associated attributes, and finally pushes the user lists in a mutual manner, thereby overcoming the disadvantage in the prior art that an SNS user, after creating user data, can pay a return visit to other SNS users having the same interest or a complementary relationship only after passively waiting for other SNS users to visit. In the present invention, based on user data created by a user, the SNS system automatically searches for associated users thereof, thereby implementing mutual pushing of the associated users, so that communication between SNS users becomes more efficient and convenient.

Persons of ordinary skill in the art may understand that all or part of the flows in the methods according to the foregoing embodiments may be implemented by a computer program instructing relevant hardware. The program may be stored in a computer-readable storage medium. When the program is executed, the flows of the embodiments of each method may be included, wherein the storage medium may be a magnetic disk, an optical disk, a Read-Only Memory (ROM), or a Random Access Memory (RAM), and so on.

The foregoing descriptions are merely preferred embodiments of the present invention. It should be noted that for those of ordinary skill in the art, several improvements and modifications may be also made without departing from the principle of the present invention. These improvements and modifications should be also regarded as the protection scope of the present invention.

The invention claimed is:

1. A method for pushing an associated user in a Social Networking Service (SNS) network, wherein it comprises:
   respectively collecting a plurality of pieces of user data created in a predefined period by each SNS user in an SNS network;
   setting access rights for the plurality of pieces of user data, respectively;
   extracting, from user data with accessible rights, at least one label and attribute belonging to the SNS user, wherein the label represents concern or interest of each SNS user and the attribute indicates whether the concern or the interest represented by the label has been practiced;
   generating a user list consisting of a plurality of SNS users having the same label and the same attribute;
   pushing, in a bidirectional manner, user lists having the same label and associated attributes.

2. The method according to claim 1, wherein the user data created by the SNS user in the SNS network may be one or more of a blog, picture description and a microblog.

3. The method according to claim 2, wherein the attribute association is mutual demands or mutual complementation.

4. The method according to claim 1, wherein pushing the user lists having the same label and associated attributes in a bidirectional manner comprises:
   pushing a user list having the same label and associated attributes to a plurality of SNS users in another user list.

5. The method according to claim 4, wherein pushing the user lists having the same label and associated attributes in a bidirectional manner further comprises:
   pushing user data created by a plurality of SNS users in the user list having the same label and associated attributes to a plurality of SNS users in another user list.

6. An SNS network system, wherein it comprises:
   a data collecting module, configured to respectively collect a plurality of pieces of user data created in a predefined period by each SNS user in an SNS network;
   a label extracting module, configured to extract, from user data with accessible rights, at least one label and attribute belonging to the SNS user, wherein the label represents concern or interest of each SNS user and the attribute indicates whether the concern or the interest represented by the label has been practiced;
   a list generating module, configured to generate a user list consisting of a plurality of SNS users having the same label and the same attribute;
   a bidirectional pushing module configured to push, in a bidirectional manner, user lists having the same label and associated attributes.

7. The system according to claim 6, wherein the data collecting module is configured to collect user data of one or more of a blog, picture description and a microblog created by each SNS user in the SNS network.

8. The system according to claim 7, wherein the attribute association is mutual demands or mutual complementation.

9. The system according to claim 6, wherein the bidirectional pushing module comprises:
   a user pushing sub-module configured to push a user list having the same label and associated attributes to a plurality of SNS users in another user list.

10. The system according to claim 9, wherein the bidirectional pushing module further comprises:
    a data pushing sub-module configured to push user data created by a plurality of SNS users in a user list having the same label and associated attributes to a plurality of SNS users in another user list.

11. The method according to claim 2, wherein pushing the user lists having the same label and associated attributes in a bidirectional manner comprises:
    pushing a user list having the same label and associated attributes to a plurality of SNS users in another user list.

12. The method according to claim 3, wherein pushing the user lists having the same label and associated attributes in a bidirectional manner comprises:
    pushing a user list having the same label and associated attributes to a plurality of SNS users in another user list.

13. The method according to claim 11, wherein pushing the user lists having the same label and associated attributes in a bidirectional manner further comprises:
    pushing user data created by a plurality of SNS users in the user list having the same label and associated attributes to a plurality of SNS users in another user list.

14. The method according to claim 12, wherein pushing the user lists having the same label and associated attributes in a bidirectional manner further comprises:
    pushing user data created by a plurality of SNS users in the user list having the same label and associated attributes to a plurality of SNS users in another user list.

15. The system according to claim 7, wherein the bidirectional pushing module comprises:
    a user pushing sub-module configured to push a user list having the same label and associated attributes to a plurality of SNS users in another user list.

16. The system according to claim 8, wherein the bidirectional pushing module comprises:
    a user pushing sub-module configured to push a user list having the same label and associated attributes to a plurality of SNS users in another user list.

17. The system according to claim 15, wherein the bidirectional pushing module further comprises:
    a data pushing sub-module configured to push user data created by a plurality of SNS users in a user list having the same label and associated attributes to a plurality of SNS users in another user list.

18. The system according to claim 16, wherein the bidirectional pushing module further comprises:
    a data pushing sub-module configured to push user data created by a plurality of SNS users in a user list having the same label and associated attributes to a plurality of SNS users in another user list.

* * * * *